(12) United States Patent
Tsuzuki

(10) Patent No.: US 6,353,790 B1
(45) Date of Patent: Mar. 5, 2002

(54) GAS TURBINE AEROENGINE CONTROL SYSTEM

(75) Inventor: Sadachika Tsuzuki, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/636,751

(22) Filed: Aug. 11, 2000

(30) Foreign Application Priority Data

Oct. 5, 1999 (JP) .............................. 11-284472

(51) Int. Cl.[7] .............................. F02K 3/06; F02K 1/17; F02C 9/28
(52) U.S. Cl. .......................... 701/100; 701/11; 701/14; 60/238; 60/239; 60/223; 60/204; 60/243
(58) Field of Search ............................. 701/100, 14, 11, 701/12; 714/49, 51; 60/204, 236, 242, 235, 234, 239

(56) References Cited

U.S. PATENT DOCUMENTS

| | | | |
|---|---|---|---|
| 4,242,864 A | * 1/1981 | Cornett et al. | 60/226 |
| 4,414,807 A | * 11/1983 | Kerr | 60/204 |
| 4,622,667 A | 11/1986 | Yount | 371/9 |
| 4,716,531 A | 12/1987 | Saunders et al. | 701/100 |
| 5,550,736 A | 8/1996 | Hay et al. | 701/26 |
| 5,622,045 A | * 4/1997 | Weimer et al. | 60/204 |
| 6,176,074 B1 | * 1/2001 | Thompson et al. | 60/39.03 |

FOREIGN PATENT DOCUMENTS

| | | |
|---|---|---|
| EP | 0 096 510 A2 | 12/1983 |
| EP | 0 668 552 A1 | 8/1995 |

* cited by examiner

Primary Examiner—William A. Cuchlinski, Jr.
Assistant Examiner—Tuan C To
(74) Attorney, Agent, or Firm—Arent Fox Kintner Plotkin & Kahn, PLLC

(57) ABSTRACT

In a control system for a gas turbine aero engine, the control system (ECU) is configured as a dual control system comprising two channels, Ch-A and Ch-B. Ch-A has two CPUs which conduct calculations separately based on the sensor outputs and one of the CPUs compares the results and if they coincide, the CPU sends the result of the other CPU to the FCU. If not, one of the CPUs determines that an abnormality arises in Ch-A and sends a result to Ch-B. Ch-B is constituted as a standby channel having only one CPU whose operation is monitored by a simple watchdog timer circuit. This enhances CPU failure detection with a relatively simple configuration, and eliminates the need for provision of an overspeed protector.

8 Claims, 5 Drawing Sheets

GAS TURBINE AEROENGINE CONTROL SYSTEM

BACKGROUND OF THE INVENTION

1. Field of the Invention

This invention relates to a control system for a gas turbine aeroengine.

2. Description of the Related Art

Safety is the top priority in an aircraft engine. Therefore, as taught by U.S. Pat. No. 4,716,531, for example, an aircraft engine is equipped with dual (two-channel) control systems and each control system is provided with a monitor system. If the active control system should fail, the other control system takes over control. This system configuration is required by aviation laws and regulations.

Such control systems today utilize an electronic control unit equipped with CPUs (central processing units). Failure detection is particularly difficult with regard to the CPUs among the various unit components. The aforesaid prior art system detects CPU failure by use of a WDT (watchdog timer) circuit and is therefore not adequate regarding failure detection accuracy. An overspeed protector has to be separately installed to make up for this deficiency.

CPU failure detection accuracy can be upgraded by using two or more additionally installed CPUs for monitoring. However, when this configuration is simply applied to a dual system, a total of at least four CPUs is required. The configuration therefore becomes complex and disadvantageous from the aspects of size and cost.

SUMMARY OF THE INVENTION

An object of this invention is therefore to overcome the problems of the prior art by providing a control system for a gas turbine aeroengine that achieves a dual control system with an electronic control unit using CPUs, enhances CPU failure detection with a relatively simple configuration, and eliminates the need for provision of an overspeed protector.

For realizing this object, the present invention provides a system for controlling a gas turbine aeroengine having at least a turbine which is rotated by gas produced by the engine to rotate a rotor that sucks in air, having: a first control system including; a speed sensor for detecting a rotational speed of the turbine; operator desired power output detecting means for detecting a desired power output of the engine specified by an operator; first command value calculating means for calculating a first command value based at least on the detected rotational speed of the turbine and the desired power output such that a fuel flow rate to be supplied to the engine is brought to a prescribed value in at least a case when the detected rotational speed of the turbine exceeds a predetermined value, while calculating the first command value at a fuel flow rate needed to bring the detected rotational speed of the turbine to a speed corresponding to the desired power output in at least a case when the detected rotational speed of the turbine does not exceed the predetermined value; fuel supplying means for supplying fuel to the engine based on the calculated command value; and first monitor means for monitoring whether operation of the first command value calculating means is normal. In the system, the first monitor means including: second command value calculating means for calculating a second command value based at least on the detected rotational speed of the turbine and the desired power output such that the fuel flow rate to be supplied to the engine is brought to the prescribed value in at least the case when the detected rotational speed of the turbine exceeds the predetermined value, while calculating the second command value at the fuel flow rate needed to bring the detected rotational speed of the turbine to the speed corresponding to the desired power output in at least the case when the detected rotational speed of the turbine does not exceed the predetermined value; and command value comparing means for comparing the first command value and the second command value with each other and for sending the first command value to the fuel supplying means when the first command value and the second command value coincide completely or at least substantially, the second control system, provided parallel with the first control system, the second control system including:third command value calculating means for calculating a third command value based at least on the detected rotational speed of the turbine and the desired power output such that the fuel flow rate to be supplied to the engine is brought to the prescribed value in at least the case when the detected rotational speed of the turbine exceeds the predetermined value, while calculating the third command value at the fuel flow rate based on the desired power output in at least the case when the detected rotational speed of the turbine does not exceed the predetermined value; and second monitor means for monitoring whether operation of the third command value calculating means is normal and for generating a command value such that the fuel flow rate to be supplied to the engine is brought to the prescribed value when the operation of the third command value calculating means is monitored to be not normal; and the first monitoring means sends the third command value to the fuel supplying means when the operation of the first command value calculating means is monitored to be not normal.

BRIEF DESCRIPTION OF THE DRAWINGS

The above and other objects and advantages of the invention will be more apparent from the following description and drawings, in which.

DETAILED DESCRIPTION OF THE PREFERRED EMBODIMENTS

A control system for a gas turbine aeroengine according to a first embodiment of this invention will now be explained with reference to the drawings.

Figure 1:
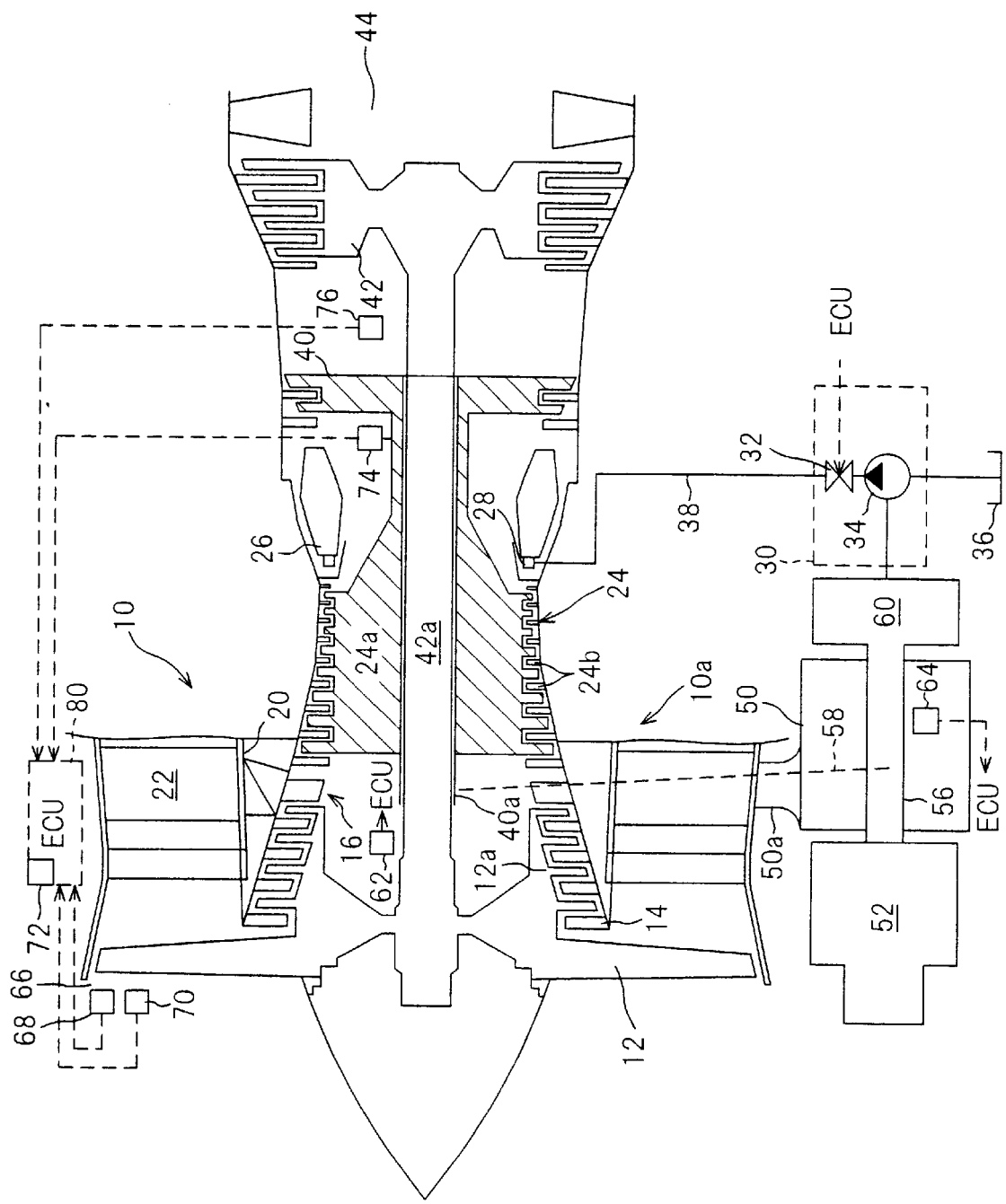
FIG. 1 is an overall schematic view of a control system for a gas turbine aeroengine according to a first embodiment of this invention.

FIG. 1 is a schematic diagram showing the overall system.

The four types of gas turbine engines ordinarily used in aircraft are the turbojet engine, turbofan engine, turboprop engine and turboshaft engine. A two-spool (shaft turbofan) engine will be taken as an example in the following explanation.

In FIG. 1, reference symbol 10 designates a turbofan engine and 10a its main engine unit. The engine 10 is mounted at an appropriate location on an airframe (not shown).

The engine 10 is equipped with a fan (rotor blades) 12 that sucks in air while rotating rapidly. A rotor 12a is formed integrally with the fan 12. The rotor 12a and a stator 14 facing it, together form a low-pressure compressor 16 that compresses the sucked-in air and pumps it rearward.

A duct (bypass) 22 is formed in the vicinity of the fan 12 by a separator 20. Most of the air pulled in passes through the duct 22 to be jetted rearward of the engine without being burned at a later stage (in the core). The force of the air accelerated rearward by the fan is balanced by a force of reaction that acts on the aircraft as a propulsive force or thrust. Much of the propulsion is produced by the air flow from the fan. The air compressed by the low-pressure compressor 16 flows rearward to a high-pressure compressor 24 where it is further compressed by a rotor 24a and a stator 24b and then flows to a combustion chamber 26.

The combustion chamber 26 is equipped with fuel nozzles 28 that pressurize fuel metered by an FCU (Fuel Control Unit) 30. The FCU 30 is equipped with a fuel metering valve 32. Fuel pumped by a fuel pump (gear pump) 34 from a fuel tank 36 located at an appropriate part of the airframe is metered by the fuel metering valve 32 and supplied to the fuel nozzles 28 through a fuel supply line 38.

The sprayed fuel is mixed with compressed air exiting the high-pressure compressor 24 and the mixture is burned after being ignited at engine starting by an exciter (not shown in FIG. 1) and a spark plug (not shown). Once the air-fuel mixture begins to burn, the air-fuel mixture composed of compressed air and fuel is continuously supplied and burned.

The hot high-pressure gas produced by the combustion flows to a high-pressure turbine 40 and rotates the high-pressure turbine 40 at high speed. The high-pressure turbine 40 is connected to the rotor 24a of the high-pressure compressor 24 by a high-pressure turbine shaft 40a. The rotor 24a is therefore also rotated.

After driving the high-pressure turbine 40, the hot high-pressure gas is sent to a low-pressure turbine 42, which it rotates at relatively low speed. The low-pressure turbine 42 is connected to the rotor 12a of the low-pressure compressor 16 through a low-pressure turbine shaft 42a. The rotor 12a is therefore also rotated. The high-pressure turbine shaft 40a and the low-pressure turbine shaft 42a are provided in a dual coaxial structure.

The hot high-pressure gas passing through the low-pressure turbine 42 (the turbine exhaust gas) is mixed with the air stream passing through the duct 22 without compression or combustion and the combined flow is jetted rearward of the engine through a jet nozzle 44.

An accessory drive gearbox (hereinafter referred to as "gearbox") 50 is attached through a stay 50a to the undersurface at the front end of the main engine unit 10a. An integrated starter/generator (hereinafter called "starter") 52 is attached to the front of the gearbox 50. The FCU 30 is located at the rear of the gearbox 50.

The engine 10 is started by operating the starter 52 to rotate a shaft 56. The rotation is transmitted to the high-pressure turbine shaft 40a through a drive shaft 58 (and an unshown gear mechanism including a bevel gear etc.) so as to pull in air needed for combustion.

The rotation of the shaft 56 is also transmitted to a PMA (Permanent Magnet Alternator) 60 and the fuel pump 34. The fuel pump 34 is therefore driven to spray fuel from the fuel nozzles 28 as explained above. The resulting air-fuel mixture is ignited to start combustion.

When the engine 10 reaches self-sustaining speed, the rotation of the high-pressure turbine shaft 40a is transmitted back through the drive shaft 58 to drive the fuel pump 34 and also drive the PMA 60 and the starter 52. The PMA 60 therefore generates electricity and the starter 52 supplies power to equipment in and on the airframe (not shown).

An N1 sensor (speed sensor) 62 installed near the low-pressure turbine shaft 42a of the engine 10 outputs a signal proportional to the rotational speed of the low-pressure turbine (speed of the low-pressure turbine shaft 42a). An N2 sensor (speed sensor) 64 installed near the shaft 56 outputs a signal proportional to the rotational speed of the high-pressure turbine (speed of the high-pressure turbine shaft 40a).

A T1 sensor (temperature sensor) 68 and a P1 sensor (pressure sensor) 70 installed near an air intake 66 at the front of the main engine unit 10a output signals proportional to the temperature T1 and the pressure P1 of the inflowing air at that location. A P0 sensor (pressure sensor) 72 installed inside an ECU (Electronic Control Unit) explained below outputs a signal proportional to atmospheric pressure P0 exerting on the engine 10.

A P3 sensor (pressure sensor) 74 installed downstream of the rotor 24a outputs a signal proportional to the output pressure P3 of the high-pressure compressor 24. An ITT sensor (temperature sensor) 76 installed at an appropriate location between the high-pressure turbine 40 and the low-pressure turbine 42 outputs a signal proportional to the temperature (representative engine temperature) ITT at that location.

The aforementioned ECU (designated by reference numeral 80) is incorporated at an upper end position of the main engine unit 10a. The outputs of the sensors mentioned above are sent to the ECU 80.

Figure 2:
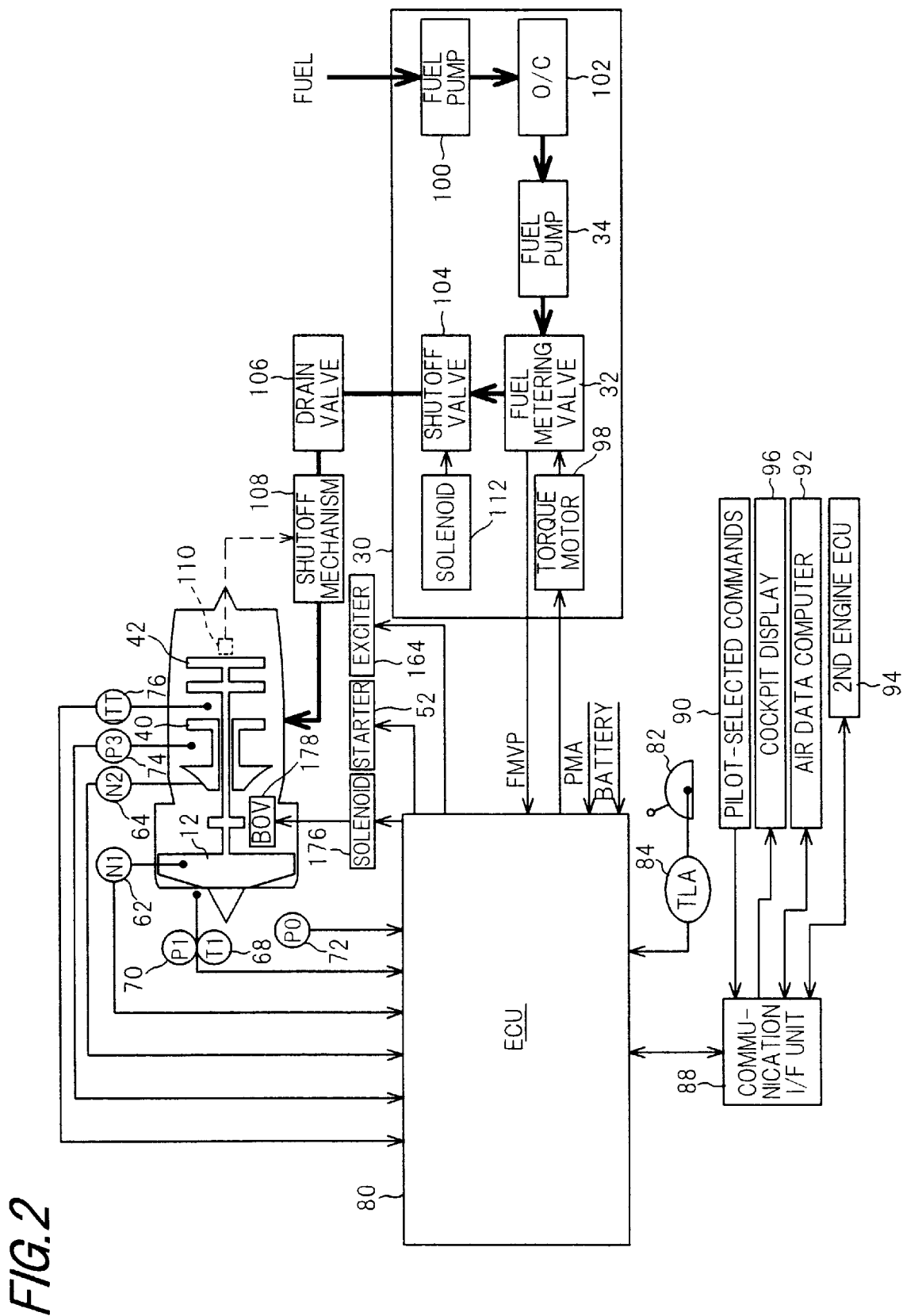
FIG. 2 is a block diagram showing the configuration of an ECU and an FCU in the system illustrated in FIG. 1.

The ECU 80 and the FCU 30 are illustrated in the block diagram of FIG. 2, with the overall configuration of the FCU 30 being shown in detail.

Figure 3:
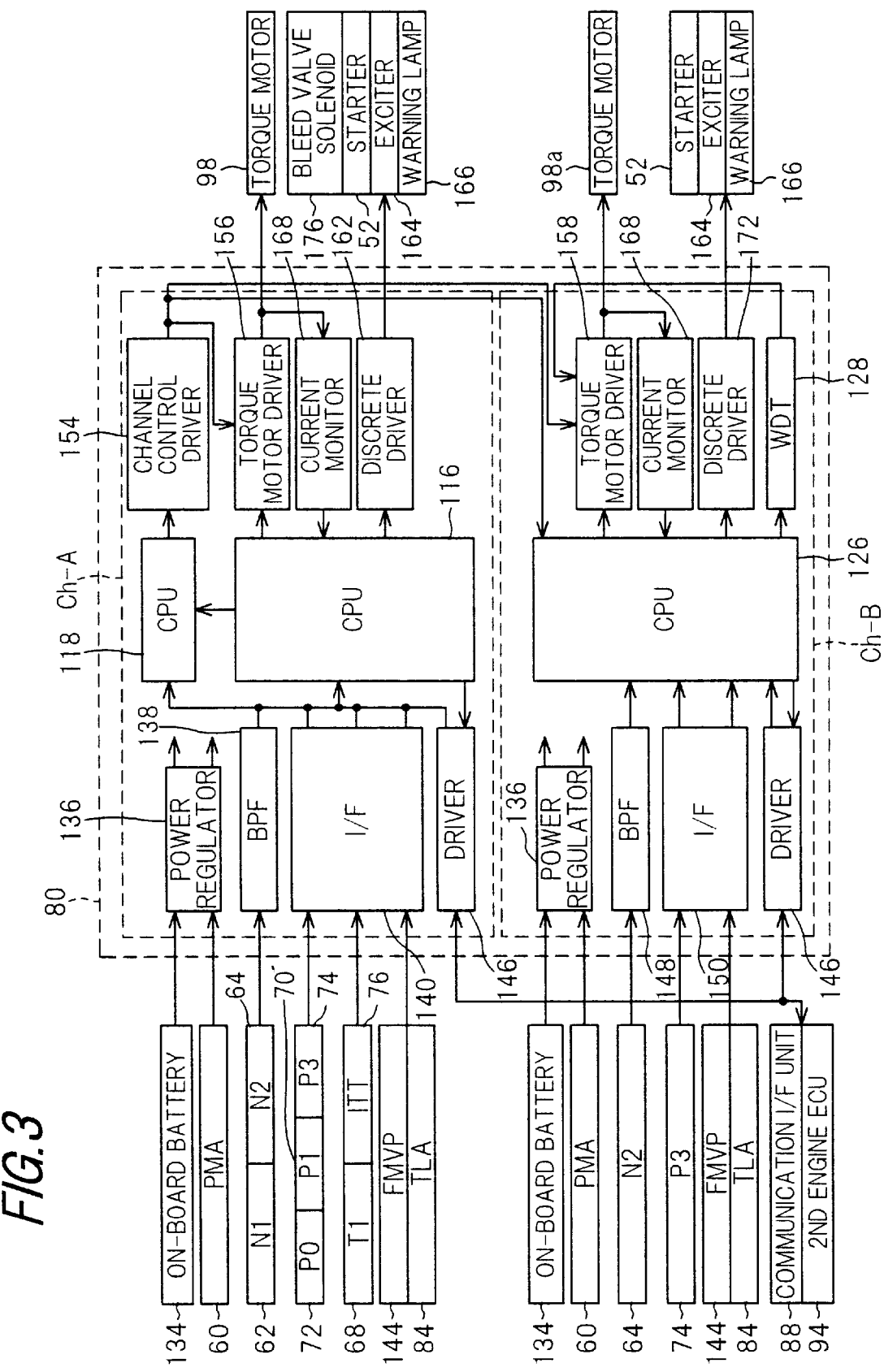
FIG. 3 is a block diagram concretely showing the configuration of the ECU illustrated in FIG. 2.
Figure 5:
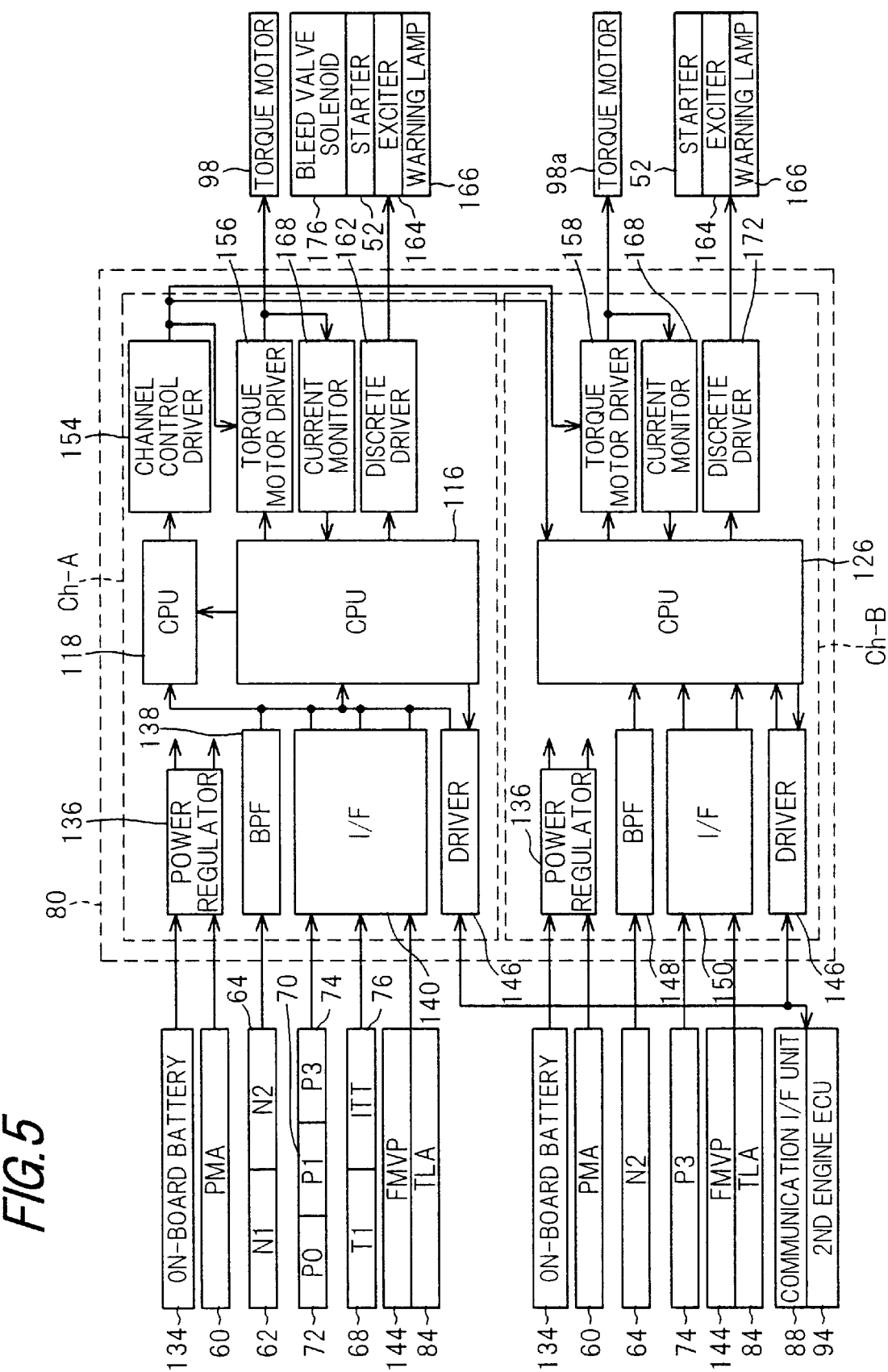
FIG. 5 is a block diagram, similar to FIG. 3, but showing the configuration of a control system for a gas turbine aeroengine according to a second embodiment of this invention, particularly the ECU thereof.

In addition to the group of sensors set out above, a TLA (throttle lever position) sensor 84 installed near a throttle lever (thrust lever) 82 provided near the pilot (operator)'s seat (cockpit; not shown) outputs a signal proportional to the throttle lever position TLA specified by the pilot (corresponding to a desired power output specified by the operator (pilot)). The output of the TLA sensor 84 is also forwarded to the ECU 80. In FIGS. 2, 3 and 5, the sensors (P0 sensor, TLA sensor etc.) are indicated by the symbols for the parameters they detect (P0, TLA etc).

An FMVP sensor (fuel metering valve position sensor; not shown in FIG. 2) installed at an appropriate location in the FCU 30 outputs a signal proportional to the valve position FMVP of the fuel metering valve 32. The output of the FMVP sensor is also forwarded to the ECU 80.

The ECU 80, mounted at an appropriate location on the airframe (not shown) is also connected with a communication interface unit 88 through which it receives (or sends) pilot-selected commands 90 from devices other than the throttle lever 82, data from an on-board computer (Air Data Computer or ADC) 92, and data from an ECU 94 installed at a second engine (not shown). The data in the ECU 80 is sent through the communication interface unit 88 to be displayed on a display 96 located in the cockpit.

Based on the input data, the ECU 80 calculates a command value (control input or manipulated variable) for supplying fuel to the engine 10 at the flow rate needed to bring low-pressure turbine shaft speed (low-pressure turbine speed) to the speed corresponding to the throttle lever position (pilot desired output) TLA. The command value is calculated as a command value indicating the amount of current to be supplied to a torque motor 98. The command value is sent to the FCU 30.

The ECU 80 further monitors whether or not the detected values of the low-pressure turbine speed N1 and the high-pressure turbine speed N2 exceed predetermined values (e.g., values equivalent to 107% of the respective maximum speeds). When either of the detected low-pressure turbine speed N1 and high-pressure turbine speed N2 exceeds the predetermined value, the ECU 80 makes an overspeed determination and then determines a current command value to be supplied to a torque motor 98 and sends the same to the FCU 30 for bringing the fuel flow rate to the engine 10 to a prescribed value, specifically to zero or a minimum value.

The FCU 30 is equipped with a low-pressure fuel pump 100 that pumps fuel from the fuel tank 36 (not shown in FIG. 2) and supplies it to the fuel pump 34 through a filter (and oil cooler) 102. The fuel pump 34 raises the fuel to a high pressure and supplies it to the fuel metering valve 32. The fuel metering valve 32 is connected with a torque motor 98 that determines its spool position. The flow rate of the fuel pressurized by the fuel pump 34 is therefore adjusted (metered) by the fuel metering valve 32 in response to the spool position thereof.

The metered fuel is supplied to the fuel nozzles 28 (not shown in FIG. 2) through a shutoff valve 104, a drain valve 106 and a shutoff mechanism 108.

An emergency stop switch 110 is connected to the low-pressure turbine shaft 42a (not shown in FIG. 2). If the low-pressure turbine shaft 42a should be displaced for some reason, the emergency stop switch 110 will turn on to operate the shutoff mechanism 108 and mechanically block supply of fuel to the fuel nozzles 28. In addition, a solenoid 112 is provided in association with the shutoff valve 104. The solenoid 112 is responsive to the pilot-selected command(s) 90 for operating the shutoff valve 104 to block supply of fuel to the fuel nozzles 28.

The ECU 80 will now be explained in detail.

The configuration of the ECU 80 is concretely illustrated in the block diagram of FIG. 3.

The control system for a gas turbine aeroengine according to this embodiment is characterized by the configuration of the ECU 80. Therefore, before explaining FIG. 3, the features that characterize the ECU 80 will be outlined with reference to FIG. 4.

As shown schematically in FIG. 4, the ECU 80 of this embodiment comprises dual control systems (two control channels), namely a first electronic control system or unit (hereinafter called "Ch-A") and a second electronic control system or unit (hereinafter called "Ch-B"). Control is conducted basically through Ch-A. When an abnormality arises in Ch-A, control is conducted through Ch-B. The ECU 80 is characterized by this configuration.

Ch-A is provided with two CPUs, a first CPU 116 and a second CPU 118. Each of the first CPU 116 and the second CPU 118 independently calculates a control input (the command value calculated as a torque motor current command value). The first CPU 116 sends its calculation result (output) to the second CPU 118. The second CPU 118 compares the received result with its own result and discriminates whether they coincide, specifically whether they completely coincide or at least substantially coincide.

When the second CPU 118 discriminates that the two calculation results completely coincide or at least substantially coincide, it forwards the output of the first CPU 116 to the FCU 30 through a driver 122 (designated OUT in FIG. 4) and a switch 120. When the second CPU 118 discriminates that the two calculation results do not coincide, it operates the switch 120 to send the output of Ch-B to the FCU 30 through a driver (OUT) 124. When the switch 120 is open (when neither Ch-A nor Ch-B is connected to the FCU 30), the fuel flow rate is set to a prescribed value, namely, zero or the minimum value. In other words, the command value is determined such that the fuel flow rate is set to the prescribed value.

Ch-B, being a channel not ordinarily used, is provided with only one CPU 126. Even when Ch-B is standing by, however, the CPU 126 must be externally monitored for failure. Ch-B is therefore provided with a relatively inexpensive and simple WDT (watchdog timer) circuit 128 for failure detection.

Ch-A is the ordinarily used channel and is therefore supplied with all sensor outputs necessary for control. Ch-B is a backup channel and is therefore supplied only with the minimum required set of sensor outputs. In other words, a somewhat lower level of control precision of Ch-B is considered tolerable.

The output of the WDT circuit 128 of Ch-B is connected to a switch 130. When failure of the CPU 126 of Ch-B is detected, the WDT circuit 128 turns off the switch 130. Therefore, if the switch 120 should be operated to connect Ch-B to the FCU 30 because the first CPU 116 (or the second CPU 118) of Ch-A has failed, but at this time the CPU 126 of Ch-B has also failed during Ch-B standby, no input will be applied to the FCU 30 because the switch 130 will be turned off. The command value will therefore be such that the fuel flow rate is set to the prescribed value (zero or minimum), i.e., the failsafe value.

This feature is meant to deal with a double failure. It is not absolutely necessary, however, because the probability of a double failure is quite low. The positioning of the switch 130 as shown in the drawing ensures that malfunctions of Ch-B do not affect Ch-A.

The configuration of the ECU 80 will now be explained with reference to FIG. 3.

Ch-A and Ch-B of the ECU 80 are connected to the PMA 60 and an on-board battery 134. Electric power is supplied through a selector circuit (not shown) from whichever of the MA 60 and the on-board battery 134 the circuit selects as providing the higher voltage. The input power is regulated to the operating voltage of the ECU and the operating voltage of a driver (explained below) by a power regulator 136.

In Ch-A, the outputs of the N1 sensor 62 and N2 sensor 64 for detecting the low-pressure turbine speed N1 and the high-pressure turbine speed N2 are input to the ECU 80, passed through a BPF (bandpass filter) 138, and stored in a RAM (random access memory; not shown).

The outputs of the P0 sensor 72, P1 sensor 70 and P3 sensor 74 for detecting the pressures P0, P1 and P3 at different engine locations and the outputs of the T1 sensor 68 and ITT sensor 76 for detecting the temperatures T1 and ITT are stored in the RAM through an I/F (interface) 140. The output of the FMVP sensor 144 for detecting the position FMVP of the fuel metering valve 32 (not shown in FIG. 3) and the output of the TLA sensor 84 for detecting the throttle lever position TLA are also stored in the RAM through the I/F 140. The communication interface (I/F) unit 88 is connected to the ECU 80 through a driver 146.

The first CPU 116 of Ch-A processes the input values in accordance with instructions stored in a ROM (read-only memory; not shown). By this, as mentioned earlier, it calculates the fuel flow rate command value (control input)

for supplying fuel to the engine 10 at the flow rate needed to bring the low-pressure turbine speed N1 to the speed corresponding to the throttle lever position TLA (the desired power output specified by the operator), as the command value indicating the amount of current to be passed through the torque motor 98.

The first CPU 116 also monitors whether or not the detected values of the low-pressure turbine speed N1 and the high-pressure turbine speed N2 exceed predetermined values (e.g., values equivalent to 107% of the respective maximum speeds). When either of the detected low-pressure turbine speed N1 and high-pressure turbine speed N2 exceeds the predetermined values, the first CPU 116 makes an overspeed determination and then calculates the fuel flow rate command value (as the current command value to be supplied to the torque motor 98) such that the fuel flow rate to be supplied to the engine 10 is brought to a prescribed value, specifically to zero or the minimum value.

The second CPU 118 similarly calculates a torque motor 98 current command value.

Ch-B will now be explained.

As explained with reference to FIG. 4, since Ch-B is a standby channel not ordinarily used, it is provided with only one CPU 126 and effects failure detection using a relatively inexpensive and simple WDT (watchdog timer) circuit 128.

Ch-B is supplied only with the minimum set of sensor outputs required for control. Specifically, it is supplied through a BPF (bandpass filter) 148 and an interface 150 with only one rpm sensor output, the output of the N2 sensor 64 for detecting the high-pressure turbine speed N2, and with only one pressure sensor output, the output of the P3 sensor 74 for detecting the pressure P3. It is not supplied with either of the temperature sensor outputs. The output of the FMVP sensor 144 and the output of the TLA sensor 84 are supplied to Ch-B in the same way as they are supplied to Ch-A. Also as in Ch-A, the connection with the communication interface unit 88 is through the driver 146.

The CPU 126 of Ch-B processes the input values in accordance with instructions stored in a ROM (not shown) to calculate a similar fuel flow rate command value (control input) for supplying fuel to the engine 10 based on the throttle lever position (desired power output) TLA, as a similar current command value indicating the amount of current to be passed through the torque motor 98a. Since the CPU 126 does not receive the low-pressure turbine speed N1, it is programmed to utilize an appropriate characteristic curve for calculating the fuel flow rate command value (as the current command value) based on the throttle lever position (desired power output) TLA. It should be noted that, while only the torque motor 98 is shown in FIG. 2, the system is also equipped with a second torque motor 98a for enhanced safety. The CPU 126 of Ch-B is connected to the second torque motor 98a.

The CPU 126 also monitors whether or not the detected value of the high-pressure turbine speed N2 exceeds the predetermined value (e.g., a value equivalent to 107% of the maximum speed). When the detected high-pressure turbine speed N2 exceeds the predetermined value, the CPU 126 makes an overspeed determination and then calculates the similar fuel flow rate command value (as a current command value to be supplied to the second torque motor 98a) such that the fuel flow rate to the engine 10 is brought to a prescribed value, specifically to zero or the minimum value. As explained with regard to FIG. 4, the first CPU 116 of Ch-A sends its calculation result to the second CPU 118 and the second CPU 118 compares it with its own calculated result.

Figure 4:
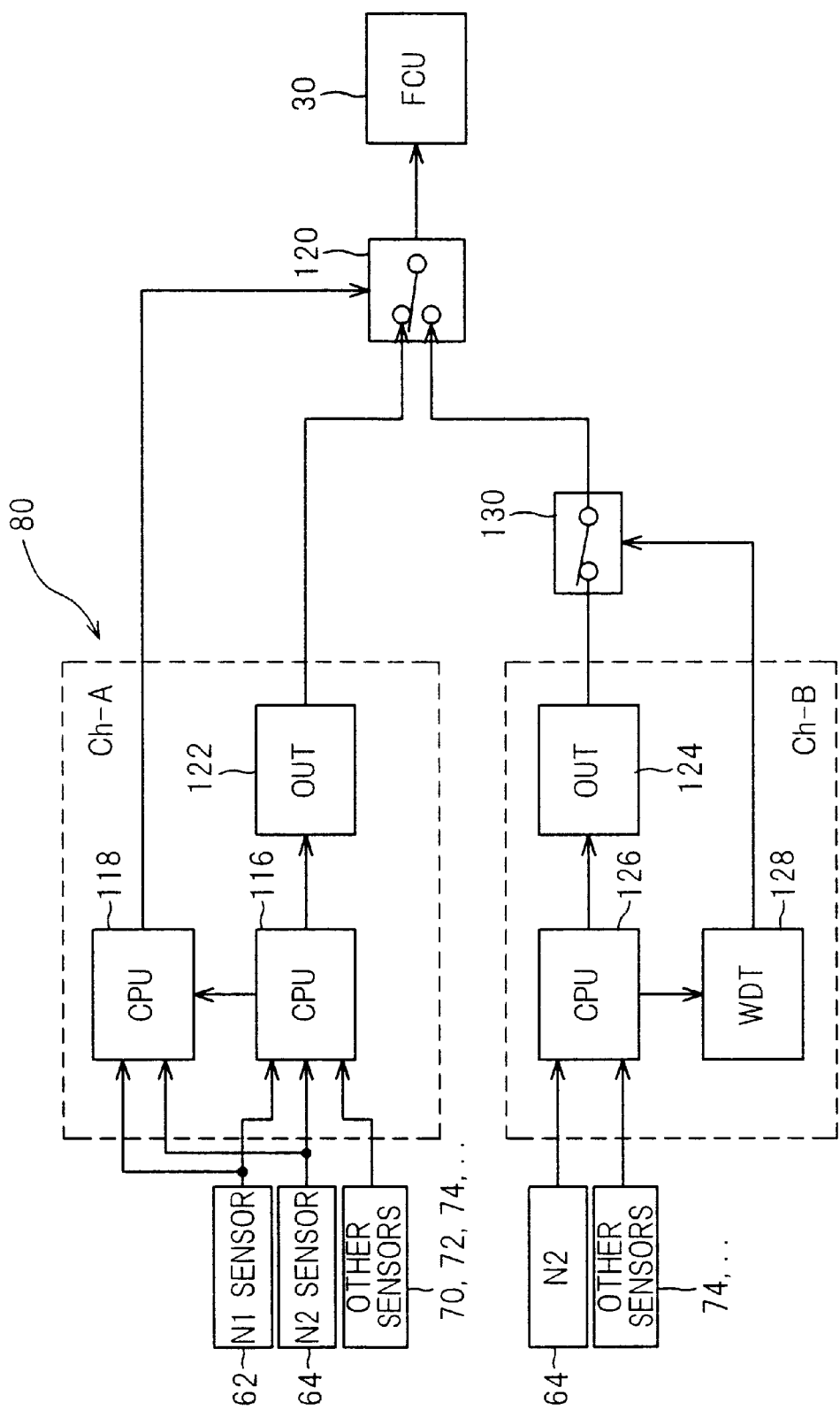
FIG. 4 is a block diagram schematically showing the structural features of the ECU illustrated in FIG. 3.

The second CPU 118 is connected to a channel control driver 154 functionally similar to the switches 120, 130 shown in FIG. 4. When the second CPU 118 discriminates that its own calculation result and the calculation result of the first CPU 116 coincide, more precisely that they completely coincide or at least substantially coincide, it produces no output. In this case, the channel control driver 154 operates a torque motor driver 156 so as to output the calculation result of the first CPU 116 to the FCU 30 and drive the torque motor 98.

On the other hand, when the second CPU 118 discriminates that its own calculation result and the calculation result of the first CPU 116 do not coincide, it sends a signal to the channel control driver 154. In this case the channel control driver 154 prevents the torque motor driver 156 from producing an output when it receives an output from the second CPU 118. It also sends a signal to the CPU 126 of Ch-B. In response, the CPU 126 outputs its calculation result through a torque motor driver 158 to drive the second torque motor 98a of the FCU 30.

The WDT circuit 128 of Ch-B monitors the operation of the CPU 126 in a known manner. When the WDT circuit 128 discriminates that the CPU 126 is operating normally, it produces no output. When the WDT circuit 128 discriminates that CPU 126 has failed, it blocks the output of the torque motor driver 158.

The remaining features of the ECU 80 will now be explained.

In Ch-A, the first CPU 116 and the second CPU 118 control the operation of the starter 52 and an exciter 164 through a discrete driver 162 in response to the operating condition of the engine 10. Further, when an overspeed condition has arisen or when otherwise necessary, the first CPU 116 informs the pilot by means of a warning lamp 166 installed in the cockpit.

The current command value supplied to the torque motor 98 is detected by a current monitor 168 and used to monitor the operation of the torque motor 98. In Ch-A, the first CPU 116 and second CPU 118 respond to torque motor 98 failure discrimination by blocking the output of the torque motor driver 156 and sending a signal through the channel control driver 154 to the CPU 126 of Ch-B. As a result, the second torque motor 98a connected to Ch-B is used in place of the malfunctioning torque motor 98. In addition, the first CPU 116 and the second CPU 118 of Ch-A control the operation of a bleed valve 178 (see FIG. 2) through a bleed value solenoid 176.

Similarly, in Ch-B, the CPU 126 controls the operation of the starter 52 and the exciter 164 through a discrete driver 172 in response to the operating condition of the engine 10. Further, when an overspeed condition has arisen or when otherwise necessary, the CPU 126 informs the pilot by means of the warning lamp 166 installed in the cockpit. When the CPU 126 discriminates occurrence of a failure in the second torque motor 98a, it blocks the output of the torque motor driver 158.

Thus in the control system for a gas turbine aeroengine according to this embodiment, the ECU 80 is constituted to have two channels. The first, Ch-A, is equipped with the first CPU 116 and the second CPU 118 and discriminates whether the first CPU 116 (and the second CPU 118) is (are) operating normally, not by use of a WDT circuit, but by having the second CPU 118 conduct the same calculation based on the same parameters as the first CPU 116 and then having it compare the result of its calculation with that of the first CPU 116. This enhances the accuracy of CPU failure detection.

The second channel, Ch-B, is a standby channel. It is therefore configured to detect failure of the CPU 126 by using the relatively inexpensive and simple WDT (watchdog timer) circuit 128 and the values input thereto are limited to the minimum set of sensor outputs required for control.

In this embodiment, the main channel and the standby channel are clearly differentiated and each channel is configured to effect optimum CPU failure detection. This enables enhanced CPU failure detection with a relatively simple configuration, without increasing size or cost. It also eliminates the need for installing an overspeed protector.

FIG. 5 is a block diagram similar to FIG. 3 showing the configuration of a control system for a gas turbine aeroengine according to a second embodiment of this invention, particularly the ECU thereof.

Only the aspects of this second embodiment that differ from the first will be explained.

In the second embodiment, the WDT circuit 128 of Ch-B is eliminated. The calculation result of the CPU 126 is sent to Ch-A and the first CPU 116 or the second CPU 118 of Ch-A checks whether the CPU 126 is operating normally. If the first CPU 116 or the second CPU 118 determines that the CPU 126 is not operating normally, it informs the result to the pilot (operator) by means of the warning lamp 166. The first CPU 116 or the second CPU 118 of Ch-A checks only whether the CPU 126 is operating normally and notifies the pilot if an abnormality arises in the CPU 126. It does not disable Ch-B operation.

This configuration of the control system for a gas turbine aeroengine according to the second embodiment is simpler than that of the first embodiment. In other aspects, the second embodiment is identical with the first.

The first and second embodiments, in particular the first embodiment is thus configured to have a system for controlling a gas turbine aeroengine (10) having at least a turbine (high-pressure turbine 40 or low-pressure turbine 42) which is rotated by gas produced by the engine to rotate a rotor (12a or 24a) that sucks in air, having: a first control system (Ch-A of ECU 80) including; a speed sensor (N1 sensor 62, N2 sensor 64) for detecting a rotational speed of the turbine (N1 or N2); operator desired power output detecting means (TLA sensor 84) for detecting a desired power output of the engine specified by an operator; first command value calculating means (first CPU 116 of Ch-A) for calculating a first command value based at least on the detected rotational speed of the turbine (N1 or N2) and the desired power output such that a fuel flow rate to be supplied to the engine is brought to a prescribed value in at least a case when the detected rotational speed of the turbine (N1, more specifically at least one of N1 and N2) exceeds a predetermined value, while calculating the first command value at a fuel flow rate needed to bring the detected rotational speed of the turbine to a speed corresponding to the desired power output in at least a case when the detected rotational speed of the turbine (N1, more specifically at least one of N1 and N2) does not exceed the predetermined value; fuel supplying means (FCU 30) for supplying fuel to the engine based on the calculated command value; and first monitor means (second CPU 118 of Ch-A) for monitoring whether operation of the first command value calculating means is normal. The characterizing portion is that the first monitor means including: second command value calculating means (second CPU 118 of Ch-A) for calculating a second command value based at least on the detected rotational speed of the turbine (N1 or N2) and the desired power output such that the fuel flow rate to be supplied to the engine is brought to the prescribed value in at least the case when the detected rotational speed of the turbine (N1, more specifically at least one of N1 and N2) exceeds the predetermined value, while calculating the second command value at the fuel flow rate needed to bring the detected rotational speed of the turbine to the speed corresponding to the desired power output in at least the case when the detected rotational speed of the turbine (N1, more specifically at least one of N1 and N2) does not exceed the predetermined value; and command value comparing means (second CPU 118, channel control driver 154 of Ch-A) for comparing the first command value and the second command value with each other and for sending the first command value to the fuel supplying means when the first command value and the second command value coincide completely or at least substantially, the second control system (Ch-B of ECU 80), provided parallel with the first control system (Ch-A), the second control system including: third command value calculating means (CPU 126 of Ch-B) for calculating a third command value based at least on the detected rotational speed of the turbine and the desired power output such that the fuel flow rate to be supplied to the engine is brought to the prescribed value in at least the case when the detected rotational speed of the turbine (N1, more specifically at least one of N1 and N2) exceeds the predetermined value, while calculating the third command value at the fuel flow rate based on the desired power output in at least the case when the detected rotational speed of the turbine (N1, more specifically at least one of N1 and N2) does not exceed the predetermined value; and second monitor means (WDT circuit 128) for monitoring whether operation of the third command value calculating means is normal and for generating a command value such the fuel flow rate to be supplied to the engine is brought to the prescribed value when the operation of the third command value calculating means is monitored to be not normal; and the first monitoring means sends the third command value to the fuel supplying means when the operation of the first command value calculating means is monitored to be not normal.

In other words, the first aspect of the embodiments defines the first control system as a main channel and the second control system as a standby channel, thus clearly differentiating the two, and configures each channel to effect optimum CPU failure detection, thereby enabling enhanced CPU failure detection with a relatively simple configuration, without increasing size or cost, and also eliminating need for installing an overspeed protector.

Moreover, the first and second embodiments, in particular the second embodiment is thus configured to have a system for controlling a gas turbine aeroengine (10) having at least a turbine (high-pressure turbine 40 or low-pressure turbine 42) which is rotated by gas produced by the engine to rotate a rotor (12a or 24a) that sucks in air, having: a first control system (Ch-A of ECU 80) including; a speed sensor (N1 sensor 62, N2 sensor 64) for detecting a rotational speed of the turbine (N1 or N2); operator desired power output detecting means (TLA sensor 84) for detecting a desired power output of the engine specified by an operator; first command value calculating means (first CPU 116 of Ch-A) for calculating a first command value based at least on the detected rotational speed of the turbine (N1 or N2) and the desired power output such that a fuel flow rate to be supplied to the engine is brought to a prescribed value in at least a case when the detected rotational speed of the turbine (N1, more specifically at least one of N1 and N2) exceeds a predetermined value, while calculating the first command value at a fuel flow rate needed to bring the detected rotational speed of the turbine to a speed corresponding to the desired power output in at least a case when the detected rotational speed of the turbine (N1, more specifically at least one of N1 and N2) does not exceed the predetermined value; fuel supplying means (FCU 30) for supplying fuel to the engine based on the calculated command value; and first monitor means (second CPU 118 of Ch-A) for monitoring whether operation of the first command value calculating means is normal. The characterizing portion is that the first monitor means including: second command value calculating means (second CPU 118 of Ch-A) for calculating a second command value based at least on the detected rotational speed of the turbine (N1 or N2) and the desired power output such that the fuel flow rate to be supplied to the engine is brought to the prescribed value in at least the case when the detected rotational speed of the turbine (N1, more specifically at least one of N1 and N2) exceeds the predetermined value, while calculating the second command value at the fuel flow rate needed to bring the detected rotational speed of the turbine to the speed corresponding to the desired power output in at least the case when the detected rotational speed of the turbine (N1, more specifically at least one of N1 and N2) does not exceed the predetermined value; and command value comparing means (second CPU 118, channel control driver 154 of Ch-A) for comparing the first command value and the second command value with each other and for sending the first command value to the fuel supplying means when the first command value and the second command value coincide completely or at least substantially, the second control system (Ch-B of ECU 80), provided parallel with the first control system (Ch-A), the second control system including: third command value calculating means (CPU 126 of Ch-B) for calculating a third command value based at least on the detected rotational speed of the turbine and the desired power output such that the fuel flow rate to be supplied to the engine is brought to the prescribed value in at least the case when the detected rotational speed of the turbine (N1, more specifically at least one of N1 and N2) exceeds the predetermined value, while calculating the third command value at the fuel flow rate based on the desired power output in at least the case when the detected rotational speed of the turbine (N1, more specifically at least one of N1 and N2) does not exceed the predetermined value; and wherein the first control system (Ch-A, more specifically, first CPU 116 or second CPU 118 of Ch-A) monitors whether operation of the third command value calculating means is normal and for informing the operator when the operation of the third command value calculating means is monitored to be not normal.

The second aspect of the embodiments also provides a control system for a gas turbine aeroengine that defines the first control system as a main channel and the second control system as a standby channel, thus clearly differentiating the two, and configures each channel to effect optimum CPU failure detection, thereby enabling enhanced CPU failure detection with a relatively simple configuration, without increasing size or cost, and also eliminating need for installing an overspeed protector. In addition, by having the first control system monitor the operation of the third fuel command value calculating means of the second control system, the second aspect of this invention achieves an even simpler configuration.

In the system, the first command value calculating means calculates the first command value such that the fuel flow rate to be supplied to the engine is brought to zero or a minimum value in at least the case when the detected rotational speed of the turbine exceeds the predetermined value.

In the system, the second command value calculating means calculates the first command value such that the fuel flow rate to be supplied to the engine is brought to zero or a minimum value in at least the case when the detected rotational speed of the turbine exceeds the predetermined value.

In the system, the third command value calculating means calculates the first command value such that the fuel flow rate to be supplied to the engine is brought to zero or a minimum value in at least the case when the detected rotational speed of the turbine exceeds the predetermined value.

It should be noted in the above that, although the foregoing embodiments are explained with regard to a turbofan engine as an example of a gas turbine aeroengine, the gas turbine aeroengine can instead be a turbojet engine, a turboprop engine, a turboshaft engine or the like.

While the invention has thus been shown and described with reference to specific embodiments, it should be noted that the invention is in no way limited to the details of the described arrangements but changes and modifications may be made without departing from the scope of the appended claims.

What is claimed is:

1. A system for controlling a gas turbine aeroengine having at least a turbine which is rotated by gas produced by the engine to rotate a rotor that sucks in air, having:

a first control system including;

a speed sensor for detecting a rotational speed of the turbine;

operator desired power output detecting means for detecting a desired power output of the engine specified by an operator;

first command value calculating means for calculating a first command value based at least on the detected rotational speed of the turbine and the desired power output such that a fuel flow rate to be supplied to the engine is brought to a prescribed value in at least a case when the detected rotational speed of the turbine exceeds a predetermined value, and for calculating the first command value at a fuel flow rate needed to bring the detected rotational speed of the turbine to a speed corresponding to the desired power output in at least a case when the detected rotational speed of the turbine does not exceed the predetermined value;

fuel supplying means for supplying fuel to the engine based on the calculated command value; and first monitor means for monitoring whether operation of the first command value calculating means is normal;

wherein the improvement comprises:

the first monitor means including:

second command value calculating means for calculating a second command value based at least on the detected rotational speed of the turbine and the desired power output such that the fuel flow rate to be supplied to the engine is brought to the prescribed value in at least the case when the detected rotational speed of the turbine exceeds the predetermined value, and for calculating the second command value at the fuel flow rate needed to bring the detected rotational speed of the turbine to the speed corresponding to the desired power output in at least the case when the detected rotational speed of the turbine does not exceed the predetermined value; and command value comparing means for comparing the first command value and the second command value with each other and for sending the first command value to the fuel supplying means when the first command value and the second command value coincide completely or at least substantially, the second control system, provided parallel with the first control system, the second control system including:

third command value calculating means for calculating a third command value based at least on the detected rotational speed of the turbine and the desired power output such that the fuel flow rate to be supplied to the engine is brought to the prescribed value in at least the case when the detected rotational speed of the turbine exceeds the predetermined value, and for calculating the third command value at the fuel flow rate based on the desired power output in at least the case when the detected rotational speed of the turbine does not exceed the predetermined value; and second monitor means for monitoring whether operation of the third command value calculating means is normal and for generating a command value such that the fuel flow rate to be supplied to the engine is brought to the prescribed value when the operation of the third command value calculating means is monitored to be not normal;

and the first monitoring means sends the third command value to the fuel supplying means when the operation of the first command value calculating means is monitored to be not normal.

2. A system according to claim 1, wherein the first command value calculating means calculates the first command value such that the fuel flow rate to be supplied to the engine is brought to zero or a minimum value in at least the case when the detected rotational speed of the turbine exceeds the predetermined value.

3. A system according to claim 1, wherein the second command value calculating means calculates the first command value such that the fuel flow rate to be supplied to the engine is brought to zero or a minimum value in at least the case when the detected rotational speed of the turbine exceeds the predetermined value.

4. A system according to claim 1, wherein the third command value calculating means calculates the first command value such that the fuel flow rate to be supplied to the engine is brought to zero or a minimum value in at least the case when the detected rotational speed of the turbine exceeds the predetermined value.

5. A system for controlling a gas turbine aeroengine having at least a turbine which is rotated by gas produced by the engine to rotate a rotor that sucks in air, having:

a first control system including;

a speed sensor for detecting a rotational speed of the turbine;

operator desired power output detecting means for detecting a desired power output of the engine specified by an operator;

first command value calculating means for calculating a first command value based at least on the detected rotational speed of the turbine and the desired power output such that a fuel flow rate to be supplied to the engine is brought to a prescribed value in at least a case when the detected rotational speed of the turbine exceeds a predetermined value, and for calculating the first command value at a fuel flow rate needed to bring the detected rotational speed of the turbine to a speed corresponding to the desired power output in at least the case when the detected rotational speed of the turbine does not exceed the predetermined value;

fuel supplying means for supplying fuel to the engine based on the calculated command value; and first monitor means for monitoring whether operation of the first command value calculating means is normal;

wherein the improvement comprises:

the first monitor means including:

second command value calculating means for calculating a second command value based at least on the detected rotational speed of the turbine and the desired power output such that the fuel flow rate to be supplied to the engine is brought to the prescribed value in at least the case when the detected rotational speed of the turbine exceeds the predetermined value, and for calculating the second command value at the fuel flow rate needed to bring the detected rotational speed of the turbine to the speed corresponding to the desired power output in at least the case when the detected rotational speed of the turbine does not exceed the predetermined value; and command value comparing means for comparing the first command value and the second command value with each other and for sending the first command value to the fuel supplying means when the first command value and the second command value coincide completely or at least substantially, the second control system, provided parallel with the first control system, the second control system including:

third command value calculating means for calculating a third command value based at least on the detected rotational speed of the turbine and the desired power output such that the fuel flow rate to be supplied to the engine is brought to the prescribed value in at least the case when the detected rotational speed of the turbine exceeds the predetermined value, and for calculating the third command value at the fuel flow rate based on the desired power output in at least the case when the detected rotational speed of the turbine does not exceed the predetermined value;

and wherein the first control system monitors whether operation of the third command value calculating means is normal and for informing the operator when the operation of the third command value calculating means is monitored to be not normal.

6. A system according to claim 5, wherein the first command value calculating means calculates the first command value such that the fuel flow rate to be supplied to the engine is brought to zero or a minimum value in at least the case when the detected rotational speed of the turbine exceeds the predetermined value.

7. A system according to claim 5, wherein the second command value calculating means calculates the first command value such that the fuel flow rate to be supplied to the engine is brought to zero or a minimum value in at least the case when the detected rotational speed of the turbine exceeds the predetermined value.

8. A system according to claim 5, wherein the third command value calculating means calculates the first command value such that the fuel flow rate to be supplied to the engine is brought to zero or a minimum value in at least the case when the detected rotational speed of the turbine exceeds the predetermined value.

\* \* \* \* \*